FIG.3

Aug. 16, 1960 H. W. WHITE 2,949,136
APPARATUS FOR THE AUTOMATIC PRODUCTION OF
CLOSED LOOPS OF WIRE FROM WIRE STOCK
Filed July 5, 1956 13 Sheets-Sheet 4

FIG. 4

Inventor
Horace Walter White
By Brown, Jackson, Boettcher & Dienner
Attys.

Aug. 16, 1960 H. W. WHITE 2,949,136
APPARATUS FOR THE AUTOMATIC PRODUCTION OF
CLOSED LOOPS OF WIRE FROM WIRE STOCK
Filed July 5, 1956 13 Sheets-Sheet 10

Inventor
Horace Walter White
By
Att'ys.

Aug. 16, 1960 H. W. WHITE 2,949,136
APPARATUS FOR THE AUTOMATIC PRODUCTION OF
CLOSED LOOPS OF WIRE FROM WIRE STOCK
Filed July 5, 1956 13 Sheets-Sheet 11

Inventor
Horace Walter White

United States Patent Office 2,949,136
Patented Aug. 16, 1960

2,949,136

APPARATUS FOR THE AUTOMATIC PRODUCTION OF CLOSED LOOPS OF WIRE FROM WIRE STOCK

Horace Walter White, Kidderminster, England, assignor to The National Standard Company Limited, Kidderminster, England, a British company Filed July 5, 1956, Ser. No. 596,002

Claims priority, application Great Britain July 7, 1955

3 Claims. (Cl. 140—88)

This invention relates to apparatus for the automatic production of a closed loop of wire from wire stock by swaging or pressing a sleeve on to the two ends of a length of wire cut from the wire stock. In particular, the invention relates to apparatus for the automatic production of cycle tyre bead wires of the kind described in British patent specification No. 679,498.

According to the invention, apparatus for the automatic production of a closed wire loop from wire stock comprises a rotatable loop former, releasable gripping means on said loop former for gripping a free end of the wire stock, means for rotating the loop former to produce a loop of wire around the loop former, means for cutting the wire stock during a dwell period of the loop former so as to separate the loop from the wire stock, and conveying means adapted to receive the wire loop produced by the loop former and to convey it through a plurality of processing stations at which the wire loop is subjected to the following sequence of operations:

(a) the two ends of the wire loop are deformed, cut or otherwise mechanically worked to form a thread or a plurality of indentations or circumferential grooves at each end of the loop, (b) the two ends of the wire loop are inserted into the opposite ends of a continuous metallic sleeve, and (c) the sleeve is closed on to the ends of the wire loop by pressing, swaging or other cold working process.

Deformation of the wire at operation (a) is generally preferred to cutting since the latter usually results in a weakening of the wire.

Since the presence of grease, dirt or other foreign matter on the wire stock reduces the strength of the sleeved joint in the finished closed loop, it is preferred to pass the loop through a cleansing station between operations (a) and (b) at which the two ends of the loop are thoroughly cleaned.

Operation (c) above is preferably a cold swaging process effected in a rotary swaging machine of the kind described in U.S. application Serial No. 234,922, now Patent No. 2,747,442.

If desired, the loop may pass through one or more further processing stations after the completion of operation (c), at which faulty loops are rejected after they have been proof-loaded and checked for correct size.

Preferably the apparatus is entirely, or for the greater part, pneumatically operated and controlled.

One form of apparatus in accordance with the invention will now be described with reference to the accompanying drawings, in which.

Figure 1:
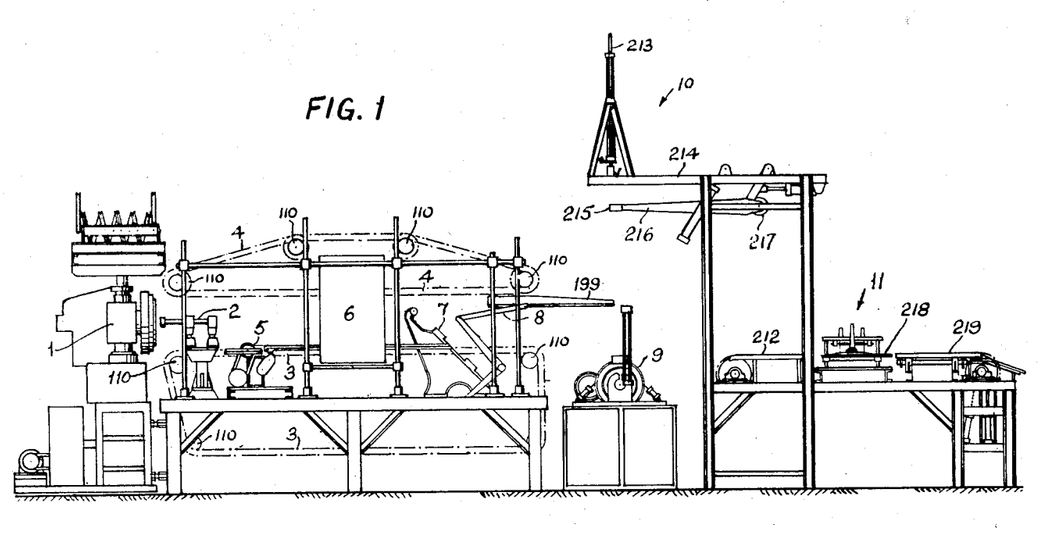
Figure 1 is a side view of the apparatus.

Figure 1 does not show the parts of the apparatus in detail and is provided merely to indicate the relative positions of the loop former and the various processing stations in the apparatus.

Referring to Figure 1, the apparatus illustrated comprises a loop former 1 which is adapted to receive wire stock and to produce substantially circular loops therefrom at regular intervals. The wire loops produced at the loop former are transferred from the latter by a transferring mechanism 2 to conveyors 3, 4 which lead each loop in succession through a thread rolling station 5 where a thread is rolled on the two ends of the loop, a cleansing station 6 where the threaded ends of the loop are cleaned and a sleeving station where a sleeve is secured temporarily to the two ends of the loop. After leaving the sleeving station 7 each loop is moved by a further transferring mechanism 8 to a rotary swaging machine 9 where the above-mentioned sleeve is swaged on to the threaded ends of the loop. A further transferring mechanism 10 moves each loop in turn from the swaging machine 9 to a station 11 where the loops are checked for correct size and where they are proof-loaded.

The loop former 1 is shown in detail in Figures 2 to 6. To simplify these figures various parts of the loop former have been omitted from each figure. Thus in Figures 2 and 6 the loop forming drum is not shown in detail and some of the parts shown in Figure 6 have been omitted from Figure 2. Referring to these figures, and in particular to Figure 4, the loop former comprises a loop forming drum 12 consisting of three drum segments 13, 14 and 15 mounted on a backplate 16. Studs 17 in the backplate 16 pass through slots 18 in the drum segments 13—15 to enable radial adjustment of the drum segments 13—15 relative to the back-plate so that the diameter of the drum can be adjusted. To this end a toothed ring 19 rotatably mounted on the backplate 16 has three cams 20 secured thereto, each cam engaging a recess 21 in one of the segments 13—15. A hole 22 in the segment 13 is adapted to receive a key consisting of a shaft of circular cross-section and a small toothed pinion mounted on the shaft, the toothed pinion being adapted to mesh with the teeth 23 on the ring 19 when the shaft of the key is inserted in the hole 22. By slackening the nuts 24 and rotating the key in one direction in the hole 22 it will be appreciated that the ring 19 can be rotated to cause the cams 20 to force the segments 13—15 outwardly. If the key is rotated in the other direction springs 25 mounted between the back-plate 16 and the segments 13—15 urge the latter radially inwards against the cams 20. When the diameter of the drum 12 has been adjusted to the desired size in this way the key is removed from the hole 22 and the nuts 24 are tightened.

Figure 2:
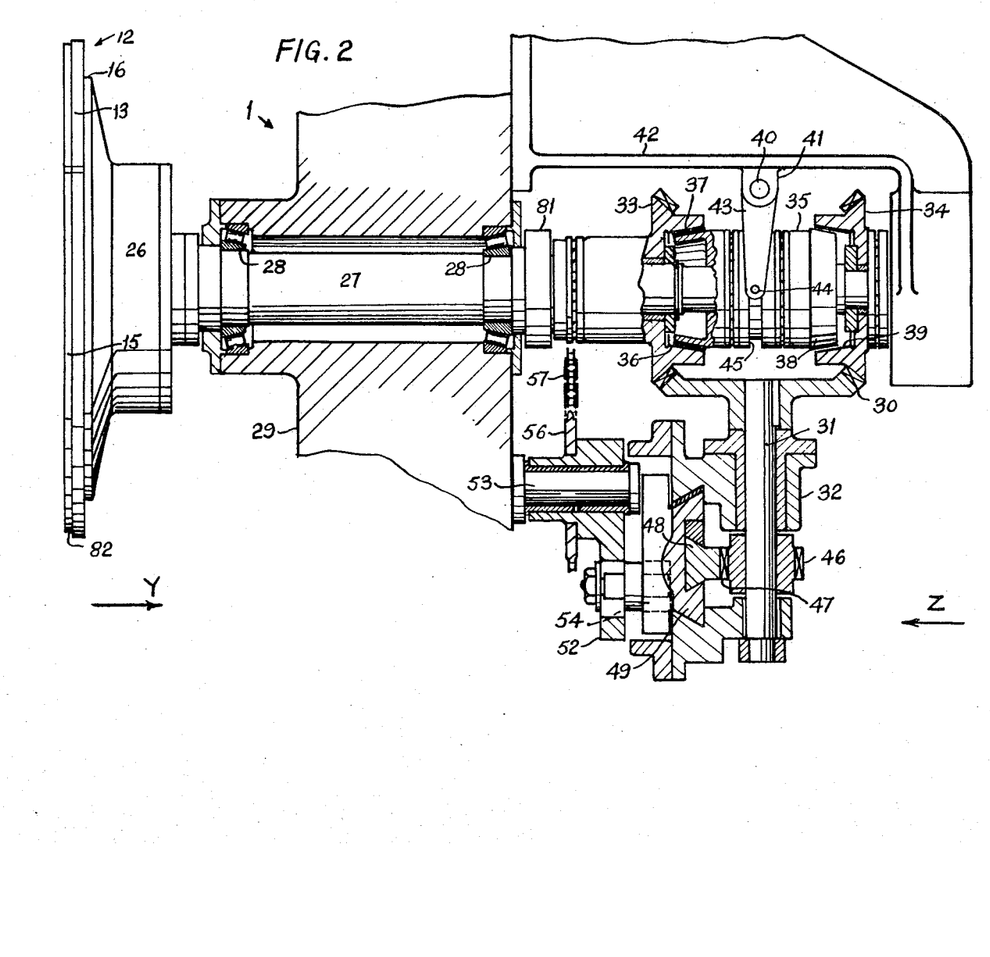
Figure 2 is a partly sectioned side view of the loop former of the apparatus.

The backplate 16 comprises a hub 26 which is keyed to a shaft 27 (see Figure 2). The shaft 27 is mounted for rotation about a horizontal axis in bearings 28 in a frame member 29 of the apparatus. The shaft 27 defines the longitudinal axis of the entire apparatus referred to hereinafter.

The shaft 27 and drum 12 are rotated by a bevel gear 30 secured to a shaft 31 which is mounted for rotation about a vertical axis in a frame member 32. The bevel gear 30 meshes with two bevel gears 33, 34 rotatably mounted on the shaft 27. Between the bevel gears 33, 34 a clutch member 35 is keyed or splined to the shaft 27 so that it rotates with the shaft but is capable of sliding along the shaft. When the clutch member 35 is moved to the left (as viewed in Figure 2) a frusto-conical clutch plate 36 engages a frusto-conical seating 37 in the bevel gear 33. When the clutch member 35 is moved to the right (as viewed in Figure 2) a frusto-conical clutch plate 38 engages a frusto-conical seating 39 in the bevel gear 34. Movement of the clutch member 35 on the shaft 27 is effected by a pair of arms secured to a shaft 40 pivotally mounted in a boss 41 forming a part of a frame member 42. One of these arms is shown in Figure 2 and is designated 43. A pin 44 on each of the arms 43 engages a circumferential groove 45 in the clutch member 35. Rotation of the shaft 40 to cause the clutch member 35 to engage either the bevel gear 33 or the bevel gear 34 is effected by means of a pneumatic cylinder (not shown).

A pinion 46 keyed to the shaft 31 engages a rack 47 mounted on an auxiliary slide 48. The latter is slidably mounted in a main slide 49 which is itself slidably mounted in the frame member 32. The auxiliary slide 48 is connected to the piston rod 50 of a pneumatic cylinder 51 mounted on the main slide 49.

Figure 3:
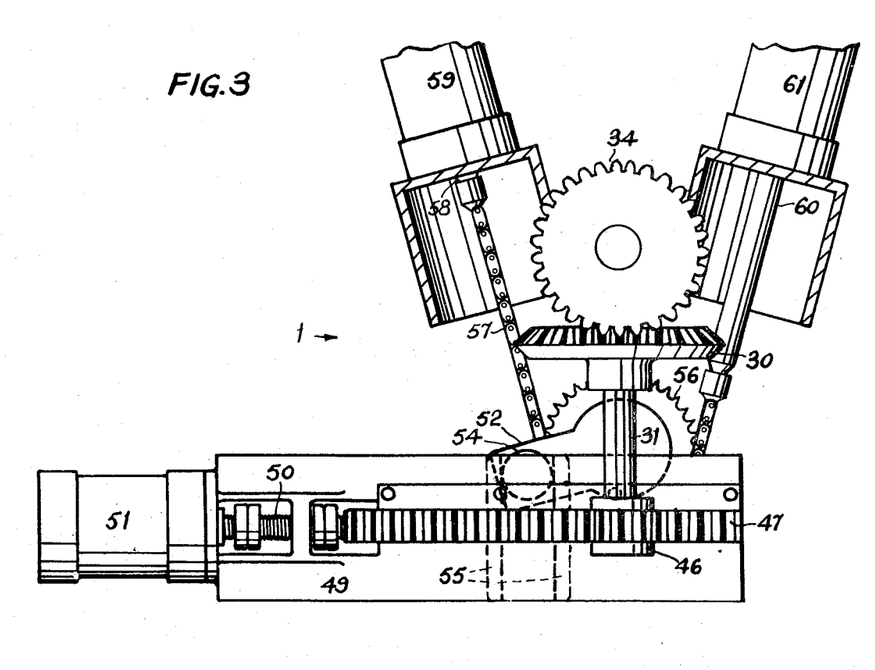
Figure 3 is an end view of part of the loop former, in the direction of the arrow Z in Figure 2.

A crank consisting of a crank arm 52, mounted for rotation on a shaft 53 lying parallel to the shaft 27, and a crank pin 54, is arranged to drive the main slide 49, the crank pin 54 being received between guides 55 on the slide 49 (see Figure 3). A sprocket wheel 56 is secured to the crank arm 52 with its axis coinciding with the axis of shaft 53 and a chain 57 engaging this sprocket wheel is connected at one end to the piston rod 58 of a pneumatic cylinder 59 and at its other end to the piston rod 60 of a pneumatic cylinder 61. The cylinders 59 and 61 have been omitted from Figure 2 for the sake of clarity in the drawing. By supplying compressed air to the lower end of cylinder 59 (as viewed in Figure 3) and opening cylinder 61 to exhaust, the crank arm 52 can be rotated in the clockwise direction (with reference to Figure 3). By supplying compressed air to the lower end of cylinder 61 and opening cylinder 59 to exhaust, the crank arm 52 can be rotated in the anti-clockwise direction (with reference to Figure 3). The crank arm 52 can be rotated through 180° by the cylinders 59 and 61 and this movement of the crank arm results in the main slide 49 and the auxiliary slide 48 moving either from right to left or from right to right, as viewed in Figure 3, with substantially simple harmonic motion. This movement of the main and auxiliary slides causes the rack 47 to rotate the pinion 46 which in turn causes rotation of the shaft 31 and the bevel gear 30. Rotation of the bevel gear 30 causes rotation of the shaft 27 and drum 12 through one of the bevel gears 33, 34 and the clutch member 35. Actuation of the clutch member 35 through the arms 43 is arranged so that when the crank arm 52 rotates in one direction the clutch member engages bevel gear 33 and when the crank arm rotates in the other direction the clutch member engages bevel gear 34. As a result the shaft 27, and with it the drum 12, always rotates in the same direction (in the direction of the arrow A in Figure 4) irrespective of the direction of rotation of the crank arm 52. The throw of the crank arm 52 is capable of adjustment, the pin 54 having a sliding mounting in the crank arm for this purpose. The throw of the crank arm 52 is adjusted so that rotation of the arm through 180° causes the drum to rotate through approximately 325°. Further rotation of the drum to complete one revolution is effected by supplying compressed air to the cylinder 51. This causes the auxiliary slide 48 to move relative to the main slide 49 to cause a further small rotation of the shaft 27.

Figure 4:
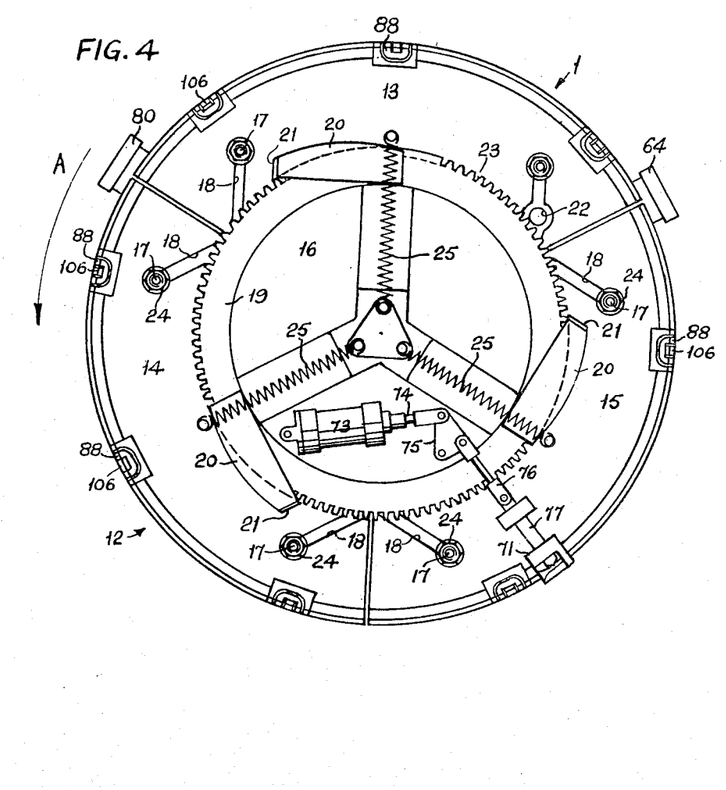
Figure 4 is an end view, on an enlarged scale, of part of the loop former in the direction of the arrow Y in Figure 2.
Figure 5:
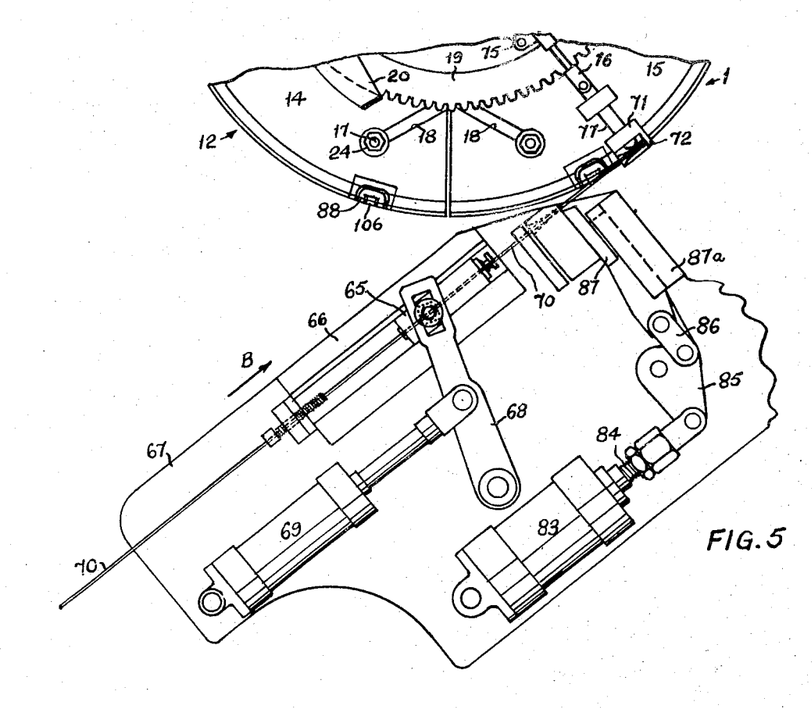
Figure 5 is an end view similar to Figure 4 showing further parts of the loop former.

Figure 5 shows a part of the loop former drum 12 in the position the drum adopts at the commencement of a loop forming operation. The drum is held in this position by a bolt 62 (see Figure 6) engaging a stop 63 secured to the hub 26. Movement of the bolt 62 into a position to engage the stop 63 is controlled by a pneumatic cylinder 64 (see Figures 4 and 6). In this position of the drum 12 the crank arm 52 is at one of the end positions of its 180° arc of travel. With the drum 12 held by the bolt 62, a feed block 65 slidably mounted beneath the drum in a guide 66 in a frame member 67 of the apparatus is moved in the direction of the arrow B by a lever 68 pivoted on the frame member 67 and actuated by a pneumatic cylinder 69. As the block 65 moves in the direction of the arrow B it grips a length of steel wire stock 70 and feeds it into a gripper 71 mounted at the periphery of the drum 12. In this feed motion the end of the wire stock 70 is moved up to a stop 72 in the gripper 71. A pneumatic cylinder 73 (see Figure 4) has its piston rod 74 connected through a bell-crank lever 75 and a link 76 to a plunger 77 slidably mounted on the drum segment 15. The plunger 77 enters the gripper 71 and when air is supplied to the left hand end of cylinder 73 (as viewed in Figure 4) the plunger 77 is forced against the wire stock 70 which has been fed into the gripper. As a result the end of the wire stock 70 is secured to the periphery of the drum 12. The block 65 is then moved by the cylinder 69 in the direction opposite to the arrow B to release the wire stock 70.

When the end of the wire stock 70 has been secured to the drum 12 in this manner the bolt 62 is disengaged from the stop 63 and the drum is rotated through the above mentioned 325° by supplying compressed air to one of the cylinders 59 and 61. At the end of this rotation of the drum a second bolt 78 engages a stop 79 on the hub 26 (see Figure 6). The movement of the bolt 78 into a position to engage the stop 79 is controlled by a pneumatic cylinder 80 arranged in the same way as the cylinder 64. The cylinder 80, which is shown in Figure 4, has been omitted from Figure 6. A pneumatically operated brake (not shown) acting for example on a portion 81 of the shaft 27 (see Figure 2) may assist the stopping of the drum 12.

This rotation of the drum 12 through 325° causes the wire stock 70 to be drawn through the block 65 and to be laid in a loop around the periphery of the drum in a step 82 formed around the edges of the segments 13—15.

A pneumatic cylinder 83 mounted on the frame member 67 has its piston rod 84 connected through a bell-crank lever 85 and a link 86 to a shearing knife 87 slidably mounted in a guide 87a on the frame member 67. When the drum has been locked in position by the pneumatically operated bolt 78, as described above, compressed air is supplied to the left hand end of the cylinder 83 (as viewed in Figure 5) to drive the shearing knife 87 towards the drum 12 to cut the wire stock 70 and separate the wire loop lying in the step 82 from the wire stock. After cutting the wire stock 70 the knife 87 is returned to the position shown in Figure 5 by supplying compressed air to the right hand end of cylinder 83 (as viewed in Figure 5). Compressed air is also supplied to the right hand end of cylinder 73 to release the wire loop at the gripper 71.

Preferably pre-cast wire is used for the wire stock 70. By using such wire the wire loop formed in the above described manner on the drum 12 lies snugly around the drum when it is released at the gripper 71 without any special precautions being necessary to prevent the loop from straightening out. A few horseshoe permanent magnets 88 arranged around the edge of the drum 12 are provided to prevent the loop from slipping relative to the drum when it has been released by the gripper 71.

When the wire loop has been formed on the drum as described above, it is removed from the drum 12 by the transfer mechanism 2 which will be described in detail hereinafter. After the loop has been removed, the bolt 78 is disengaged from the stop 79 and compressed air is supplied to the cylinder 51 to complete one revolution of the drum from the starting position shown in Figure 5. The bolt 62 is then once more engaged with the stop 63, the drum 12 is now in a position to commence the formation of another wire loop. In the formation of this next loop it will be appreciated that the crank arm 52 will rotate in the opposite direction, compared with its direction of rotation during formation of the previous loop, to move the drum through 325° in the direction of the arrow A and that the completion of the revolution of the drum will be effected by supplying compressed air to the opposite end of cylinder 51 compared with the formation of the previous loop.

Prior to commencement of the loop forming operation the diameter of the drum 12 is adjusted so that it is greater than the diameter of the closed wire loop that it is desired to produce in the apparatus. Consequently the wire loop formed on the drum 12 has a gap between its free ends and the shearing knife 87 is so positioned that this gap is arranged substantially symmetrically with respect to a vertical plane passing through the longitudinal axis of the apparatus when the drum is at rest with the bolt 78 engaging the stop 79. This gap between the ends of the wire loop is for the purpose of facilitating subsequent operations on the loop and is preferably about 6" in length. For the sake of simplicity in the ensuing description, this loop with a gap between its two ends will be referred to as a "gapped loop."

Since the diameter of the drum 12 can be adjusted it will be understood that the loop former 1 can be made to produce wire loops of any desired length.

Figure 6:
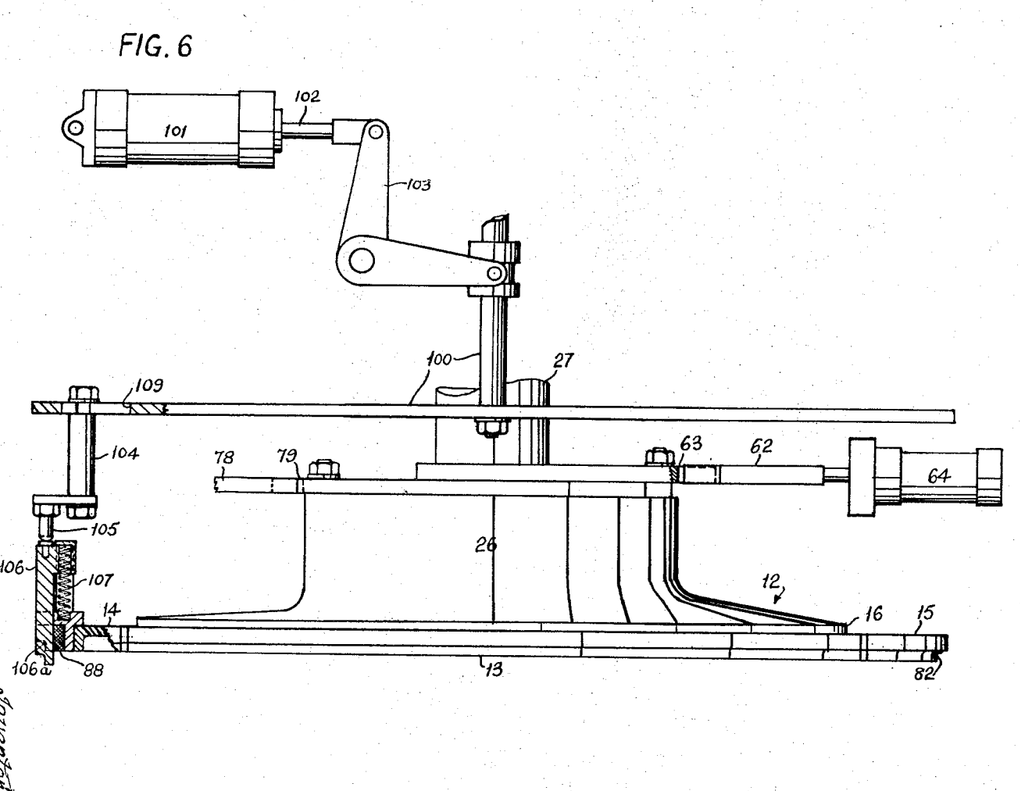
Figure 6 is a plan of a part of the loop former.
Figures 7, 9:
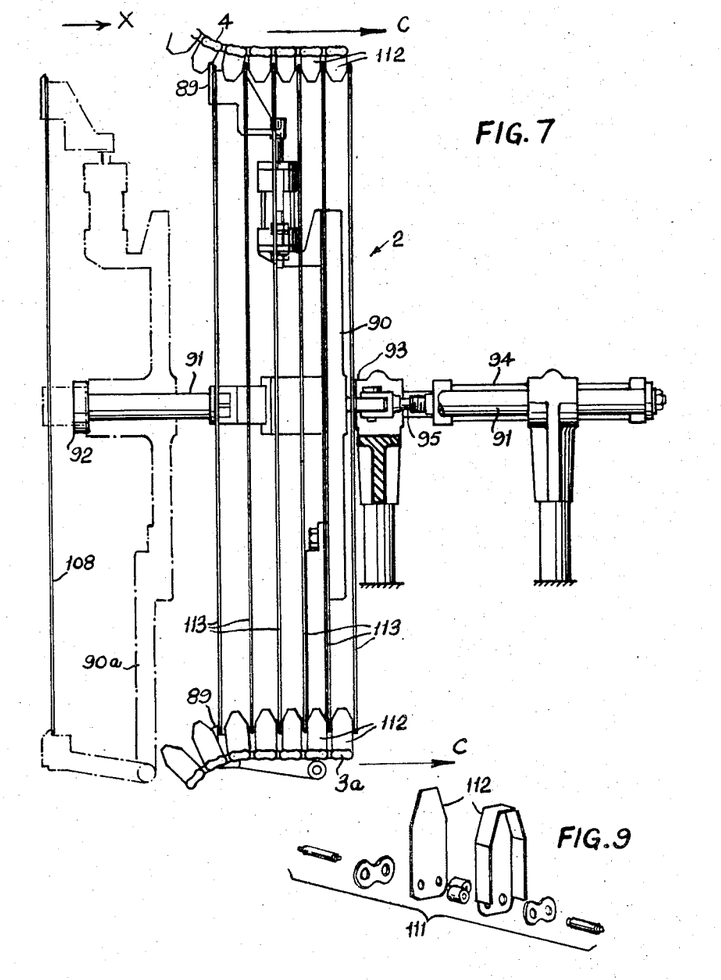
Figure 7 is a side view of a transferring mechanism of the apparatus.
Figure 9 is an exploded view of a link of one of the lower chain conveyors of the apparatus.

The transferring mechanism 2 (see Figures 1, 6, 7, 8, 12 and 13) comprises a plurality of loop holding members 89 mounted on a frame 90 which can undergo a limited sliding movement in the direction of the longitudinal axis of the apparatus between the positions shown in full lines in Figure 7 and the position 90a shown in chain lines. To this end the frame 90 is slidably mounted on two horizontal rods 91 each provided with a stop 92 to limit movement of the frame 90 towards the loop forming drum 12. Movement of the frame 90 away from the drum 12 is limited by a stop 93. Movement of the frame between the stops 92 and 93 is controlled by a pneumatic cylinder 94 the piston rod 95 of which is connected to the frame.

Each of the loop holding members 89 (see Figures 12 and 13) consists of a horseshoe permanent magnet 96 housed in a recess 97 in the frame 90 by a plate 98 and a bolt 99.

When a gapped loop has been formed on the drum 12 and has been released by the gripper 71, the drum being held with the bolt 78 engaging the stop 79, the frame 90 is moved by the cylinder 94 to the position 90a in which the loop holding members 89 lie close to the face of the drum 12.

Figures 8, 10, 11, 12, 13:
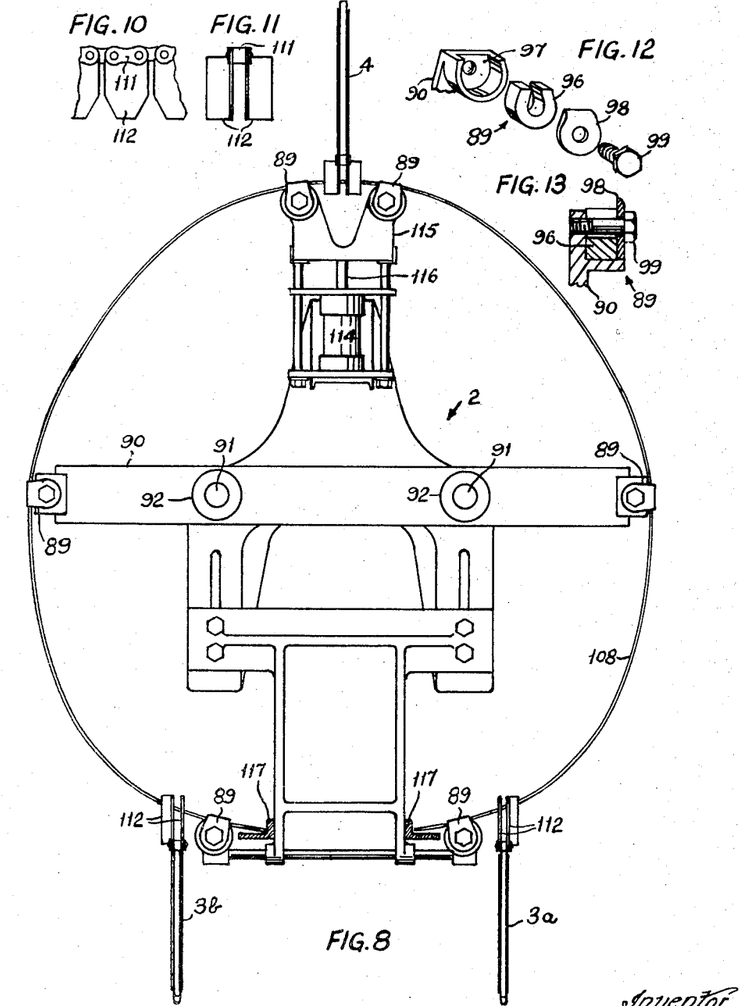
Figure 8 is an end view in the direction of the arrow X in Figure 7.
Figures 10 and 11 are a side view and an end view, respectively, of a part of the upper chain conveyor of the apparatus.
Figure 12 is an exploded view of one of the loop holding members of the transferring mechanism of Figures 8 and 9.
Figure 13 is a vertical section through one of the loop holding members.

Behind the drum 12 there is a frame 100 which can be moved in the direction of the longitudinal axis of the apparatus by a pneumatic cylinder 101, the piston rod 102 of the latter being connected to the frame 100 by a bell-crank lever 103 (see Figure 6). On the frame 100 are a number of arms 104 lying parallel to the longitudinal axis of the apparatus and each supporting a pin 105. These pins 105 are so positioned relative to the drum 12 that when the latter is in the position in which the bolt 78 engages the stop 79 each of the pins 105 is aligned with a different stripper 106 slidably mounted at the periphery of drum 12 in the centre of each of the magnets 88. Only one arm 104, one pin 105 and one stripper 106 are shown in Figure 6, whereas in actual fact there are eight strippers 106 on the drum 12 and a corresponding number of arms 104 and pins 105 mounted on the frame 100. Each stripper 106 is urged by a spring 107 into the position 106a shown in dotted lines in Figure 6 during the formation of a gapped loop on the drum. When the drum comes to rest with the bolt 78 engaging the stop 79, compressed air is supplied to the left hand end of cylinder 101 (as viewed in Figure 6) to move the frame 100 into the position shown in Figure 6. This causes each pin 105 to move its associated stripper 106 to the position shown in Figure 6 with the result that the gapped loop lying in the step 82 of the drum 12 is pushed over the tips of the plates 98 of the loop holding members 89 lying close to the face of the drum 12. The loop is then held by the magnets 96 of the loop holding members 89. Figures 7 and 8 show a gapped loop 108 when it has been moved on to the loop holding members in this manner.

In Figure 6 it will be seen that the arms 104 are mounted in slots 109 in the frame 100 so that the position of the pins 105 can be adjusted in the radial direction of the drum 12 to suit the drum diameter.

When the loop 108 has been received on the loop holding members 89, compressed air is supplied to the right hand end of cylinder 101 (as viewed in Figure 6) to restore the strippers 106 to the position 106a and compressed air is supplied to the left hand end of cylinder 94 (as viewed in Figure 7) to move the frame 90 from the position 90a up to the stop 93. In this movement of the frame 90 the gapped loop 108 is received by three chain conveyors 3a, 3b, and 4. The upper flights of the two lower chain conveyors 3a and 3b lie in the same horizontal plane parallel to the longitudinal axis of the apparatus, while the lower flight of the upper conveyor 4 is parallel to the upper flights of the two lower conveyors. The upper conveyor 4 lies in a vertical plane passing through the longitudinal axis of the apparatus and the conveyors 3a and 3b lie in vertical planes lying on each side of, and equidistant from, the vertical plane passing through the upper conveyor 4. The three conveyors are mounted on sprocket wheels 110 (see Figure 1) and they are driven together intermittently by pneumatic means (not shown) so that the lower flight of conveyor 4 and the upper flights of conveyors 3a and 3b move in the direction of the arrow C (Figure 7).

The chain links 111 of the three conveyors have the same length and they are all provided with jaws 112 for the reception of gapped loops (such as the loops 113 in Figure 7) delivered to the conveyors by the transferring mechanism 2. The jaws 112 of the upper conveyor 4 are shown in detail in Figures 10 and 11 while the jaws 112 of the lower conveyors 3a and 3b are shown in detail in Figure 9.

The three conveyors are so positioned vertically with respect to the longitudinal axis of the apparatus that when the gapped loop 108 is moved away from the drum 12 by the frame 90, with the loop lying in a substantially vertical plane, two adjacent jaws 112 of the conveyor 3a receive the loop on one side of the gap therein, two adjacent jaws 112 of the conveyor 3b receive the loop on the other side of the gap therein, and two adjacent jaws 112 of the conveyor 4 receive the loop at a point substantially opposite the gap therein. A pneumatic cylinder 114 mounted on the frame 90 may be provided for the purpose of lifting the upper portion of the gapped loop into the jaws of the conveyor 4. When this cylinder 114 is provided the two loop holding members 89 lying near the conveyor 4 are arranged on a support 115 which is secured to the vertically disposed piston rod 116 of the cylinder 114.

The gapped loop 108 is delivered to the conveyors 3a, 3b and 4 during a dwell period of the conveyors, these dwell periods of the conveyors being suitably synchronized with the movements of the loop former 1 and the transferring mechanism 2.

The three conveyors move the gapped loops received from the loop forming drum 12 through the processing stations 5, 6 and 7 after which they deliver the loops one at a time to the second transferring mechanism which will be described in detail hereinafter. In their travel up to the station 5, and between the stations 5, 6 and 7, the ends of the gapped loops bear against guide members 117 (see Figure 8).

At the station 5 the two ends of each gapped loop 113 led to the station by the conveyors are provided with a rolled thread during a dwell period of the conveyors. At the station 5 each end of a gapped loop is treated in the same way and the following description will therefore be confined mainly to a description of the handling of one end of the loop. The gapped loops are led into station 5 in the direction of the arrow D with the ends of the loops guided in two guides 118 one arranged on each side of, and equidistant from, a vertical plane passing through the longitudinal axis of the apparatus. At the right hand end of the guide 118 two jaws 119, 120 are mounted on a dovetail slide 121 which is arranged to slide in a horizontal direction at right angles to the longitudinal axis of the apparatus in a bracket 122. The latter is pivotally mounted on a frame member 123 of the apparatus by means of a pivot 124 having its axis horizontal and at right angles to the longitudinal axis of the apparatus. The jaw 119 is fixed to the slide 121 while the jaw 120 is secured to the piston rod 125 of a pneumatic cylinder 126 mounted on the slide 121. A vertically disposed pneumatic cylinder 127, pivotally mounted on the frame member 123 by a pivot 128, has its piston rod 129 pivotally connected to the bracket 122. A further pneumatic cylinder 130 (see Figure 15) carried by the bracket 122 has its piston rod 131 connected to the slide 121.

Immediately before the end of a gapped loop leaves the right hand end of the guide 118 (as viewed in Figure 14), and with the jaws 119 and 120 separated, compressed air is supplied to the lower end of the cylinder 127 so that the bracket 122 is moved about its pivot 124 in an anticlockwise direction (with reference to Figure 14) into a position in which the longitudinal axis of the piston rod 125 meets the surface of jaw 119 at a point horizontally aligned with the end of the gapped loop as it leaves the right hand end of the guide 118. When the loop comes to rest it bears against the surface of jaw 119. Compressed air is then supplied to the left hand end of cylinder 126 (as viewed in Figure 14) to move the jaw 120 towards the jaw 119 so that the end of the loop is gripped between the two jaws. Compressed air is then supplied to the upper end of the cylinder 127 (as viewed in Figure 14) to return the bracket 122 to the position shown in Figure 14. In this position of the bracket 122 the gripped end 132 of the loop is aligned with a thread rolling head 133. The other end 134 of the loop is similarly aligned with a thread rolling head 135. These two thread rolling heads are rotatably mounted in bearings 136, 137 in a frame member 138 of the apparatus, the axis of rotation of the thread rolling heads being horizontal and disposed at right angles to the longitudinal axis of the apparatus. Each thread rolling head is adapted to be rotated by a separate gear 139. Each gear 139 meshes with a pinion (not shown) driven by a pulley 140. Each pulley 140 is driven by a reversible electric motor 141. When the jaws 119, 120 grip the end of the loop compressed air is supplied to the right hand end of cylinder 130 (as viewed in Figure 15) and to the corresponding cylinder (not shown) associated with the loop end 134. As a result the jaws 119, 120 are moved in the direction of the arrow E and the loop ends 132 and 134 are fed into the thread rolling heads 133 and 135, respectively.

When the loop ends have been threaded to a sufficient length, the slide 121 operates a microswitch (not shown) to reverse the direction of rotation of the motors 141. At the same time the right hand end of cylinder 130 is connected to exhaust and the left hand end of the cylinder is supplied with compressed air. This results in the two ends 132 and 134 of the loop being withdrawn from the thread rolling heads. This return movement of the slide 121 actuates a further microswitch (not shown) again to reverse the two motors 141 in readiness for the next thread rolling operation.

Figures 14, 15:
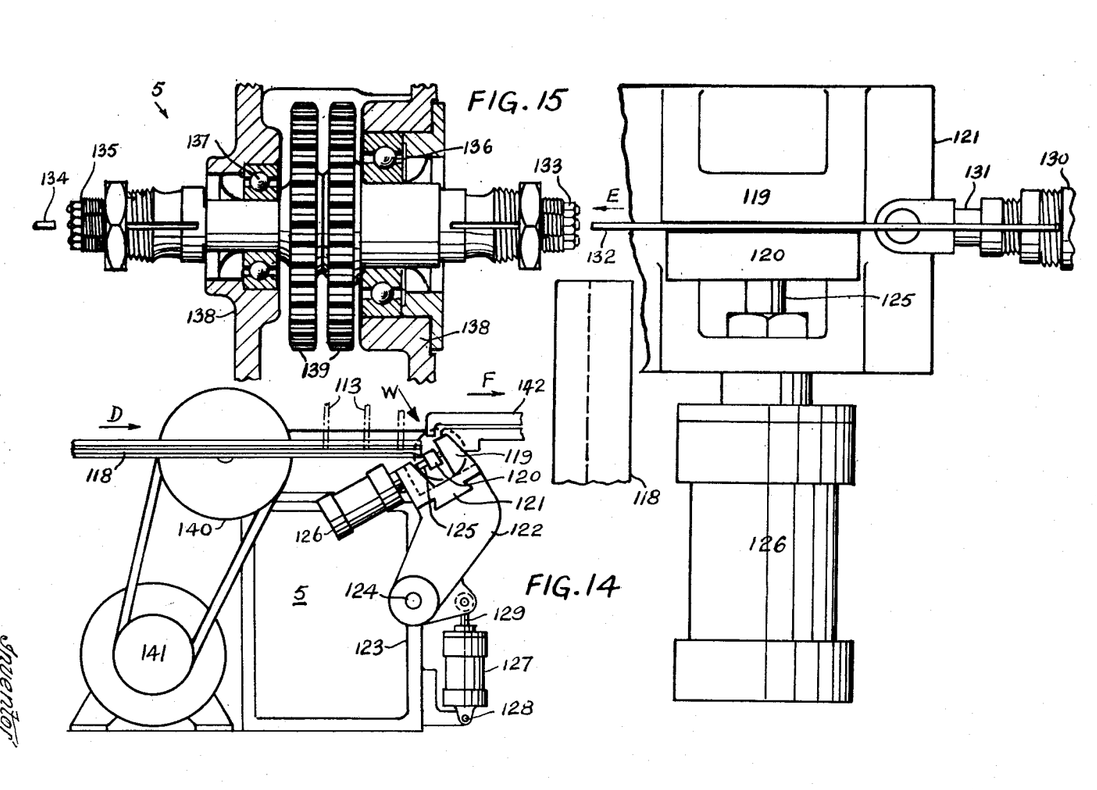
Figure 14 is a side view of part of the thread rolling station of the apparatus.
Figure 15 is a view, on an enlarged scale, in the direction of the arrow W in Figure 14.

A guide 142 lying parallel to the longitudinal axis of the apparatus and adapted to be moved vertically up and down by a pneumatic cylinder (not shown) is then moved down from the position shown in Figure 14 so that the end 132 of the loop enters the guide 142. A similar guide (not shown) is moved down to receive the loop end 134. Compressed air is then supplied to the right hand end of cylinder 126 (as viewed in Figure 14) to release the loop from the jaws 119, 120 and the guide 142 is returned to the position shown in Figure 14 to remove the loop ends from the jaws.

After the ends of each loop are threaded in this way the loops are moved by the conveyors 3a, 3b and 4 along the guides 142 in the direction of the arrow F.

Figures 16, 17, 18:
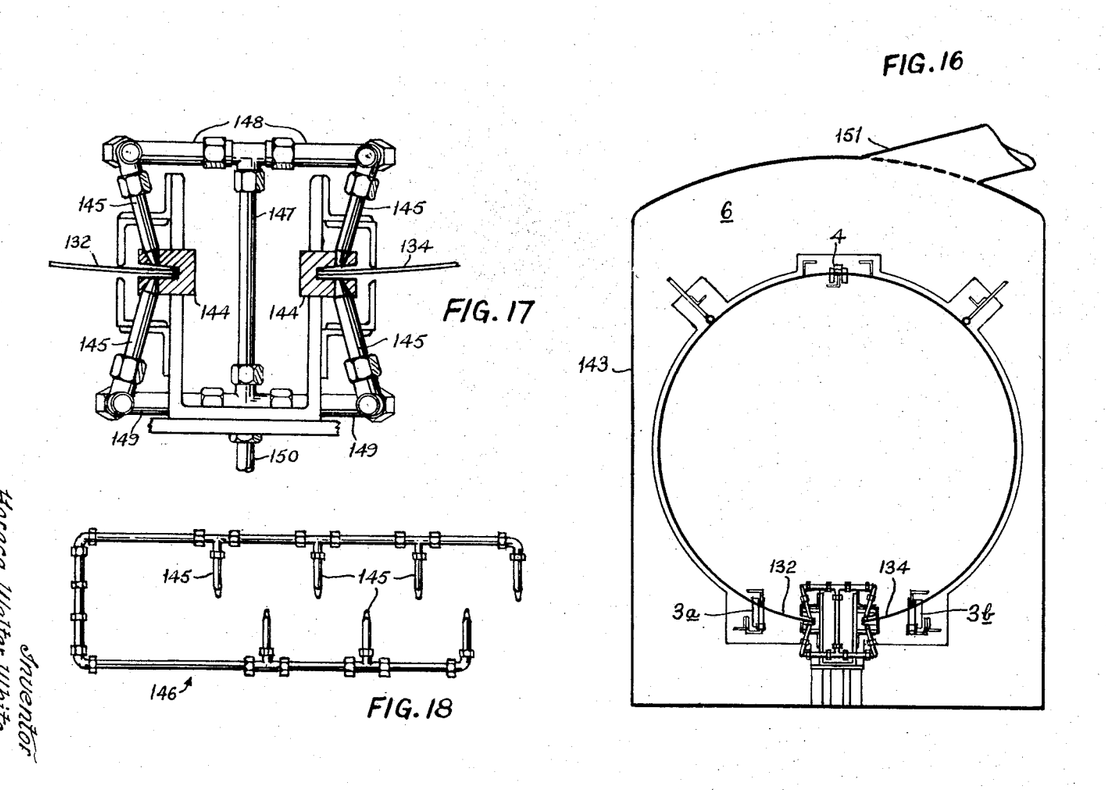
Figure 16 is an end view of the cleansing station of the apparatus.
Figure 17 is a view, on an enlarged scale, of a part of Figure 16.
Figure 18 is a side view of one bank of nozzles in the cleansing station.

From the thread rolling station 5 the gapped loops are moved through the cleansing station 6 (see Figures 16 to 18). At this station the loops are moved by the conveyors 3a, 3b and 4 through a chamber 143, the loop ends 132, 134 being received and guided in guides 144 (see Figure 17). A number of nozzles 145 mounted in the guides 144 are arranged to direct jets of suitable cleaning fluid against the loop ends as they pass along the guides 144 to remove dirt, grease and other foreign matter therefrom. The nozzles 145 associated with each guide are arranged in a bank 146 as shown in Figure 18. The two nozzle banks 146 are connected by pipes 147, 148 and 149. The cleansing fluid is supplied to the nozzles from a supply reservoir (not shown) by means of a pipe 150. A suitable fluid for cleaning the loop ends is a volatile oil solvent such as naphtha or trichlorethylene. A duct 151 leads obnoxious vapours from the chamber 143 to an exhaust (not show).

Figure 19:
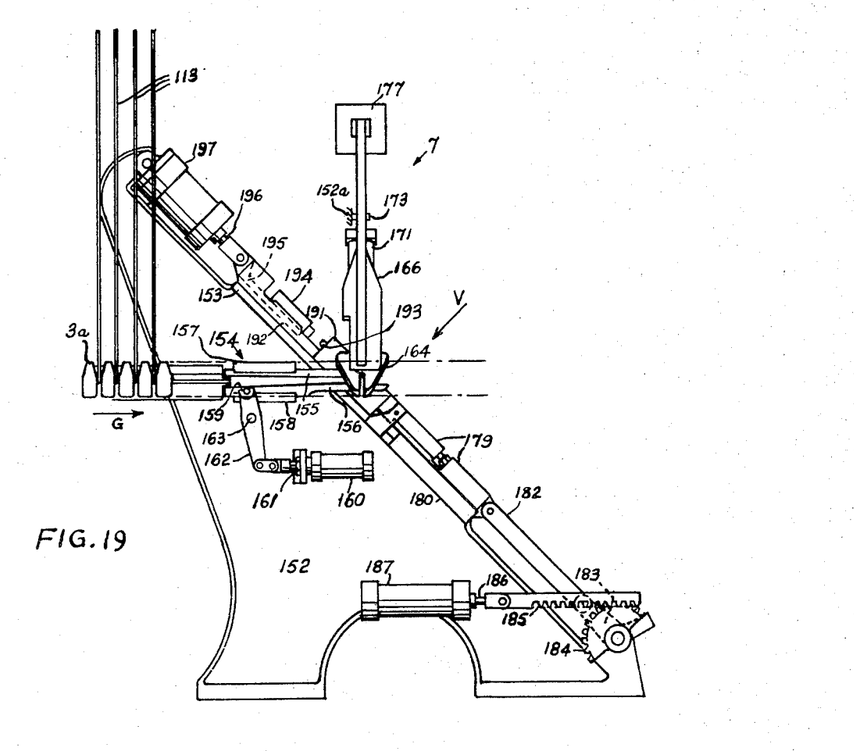
Figure 19 is a side view of the sleeving station of the apparatus.
Figure 20:
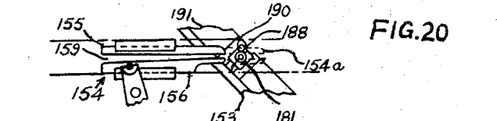
Figure 20 is a side view of a part of the apparatus of Figure 19 with the gripping jaws omitted.
Figure 21:
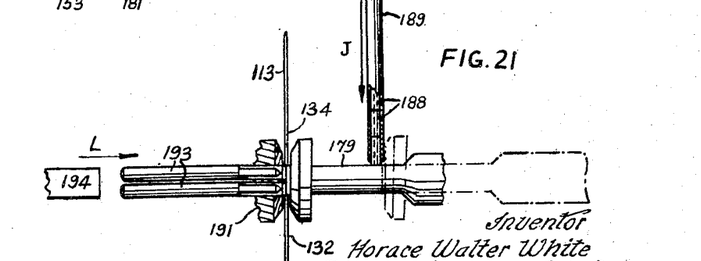
Figure 21 is a schematic view, on an enlarged scale, in the direction of the arrow V in Figure 19 showing some of the parts associated with the inclined supporting surface of Figure 19.

From the cleansing station 6 the gapped loops are moved by the conveyors 3a, 3b, 4 to the sleeving station 7 (see Figures 19 to 22). Figure 19 shows the upper flight of the lower conveyor 3a moving the gapped loops 113 towards the sleeving station in the direction of the arrow G.

The sleeving station comprises a frame member in the form of a thin substantially vertical plate 152 to which there is secured a narrow inclined plane supporting surface 153. The plate 152 is so positioned with respect to the conveyors 3a, 3b and 4 that the inclined supporting surface 153 is parallel to, and slopes downwardly in the direction of travel of, the upper flight of the conveyors 3a, 3b and lies mid-way between these conveyors partly above and partly below their upper flights.

The conveyors 3a, 3b and 4 move the gapped loops 113 intermittently towards the supporting surface 153, each loop resting in turn with its ends substantially in the plane of the supporting surface 153 during a dwell period of the conveyors before being moved past the said supporting surface in the direction of the arrow G. During each of these dwell periods of the conveyors one gapped loop is subjected to the sleeving operation described hereinafter. In their travel towards the supporting surface 153 prior to the sleeving operation the two ends of each gapped loop 113 travel along opposite sides of the plate 152, the latter being situated in a vertical plane passing through the longitudinal axis of the apparatus.

On each side of the plate 152 a guide 154, comprising upper and lower guiding surfaces 155 and 156, respectively, is slidably mounted in horizontal guides 157, 158. These two guiding surfaces 155, 156 define a substantially horizontal gap 159, which tapers from left to right, as will be seen in Figure 20. A pneumatic cylinder 160 mounted on the plate 152 has its piston rod 161 connected to one end of a link 162 which is rigidly secured intermediate its ends to a pin 163 pivotally mounted in the plate 152, with the pivoting axis of the pin 163 substantially horizontal and at right angles to the longitudinal axis of the apparatus. The end of the link 162 remote from the cylinder 160 is pivotally connected to the guide 154 lying on the same side of the plate 152 as the cylinder. The pin 163 is rigidly secured to one end of a further link (not shown), which link is supported by the pin 163 on the side of the plate 152 remote from the link 162. This further link is pivotally connected at its other end to the guide 154 (not shown) lying on the side of the plate 152 remote from the link 162. By supplying compressed air to one end or the other of the cylinder 160 it will be appreciated that the two guides 154 can be moved together in a substantially horizontal direction between the position shown in full lines and the position 154a shown in dotted lines in Figure 20. The purpose of these guides 154 is to receive the ends of the loops 113 in the gaps 159 as the loop ends pass alongside the plate 152 and to locate these ends correctly in the vertical direction when they come to rest substantially in the plane of the supporting surface 153, the guides being, at this time, in the position 154a (see Figure 20).

Figure 22:
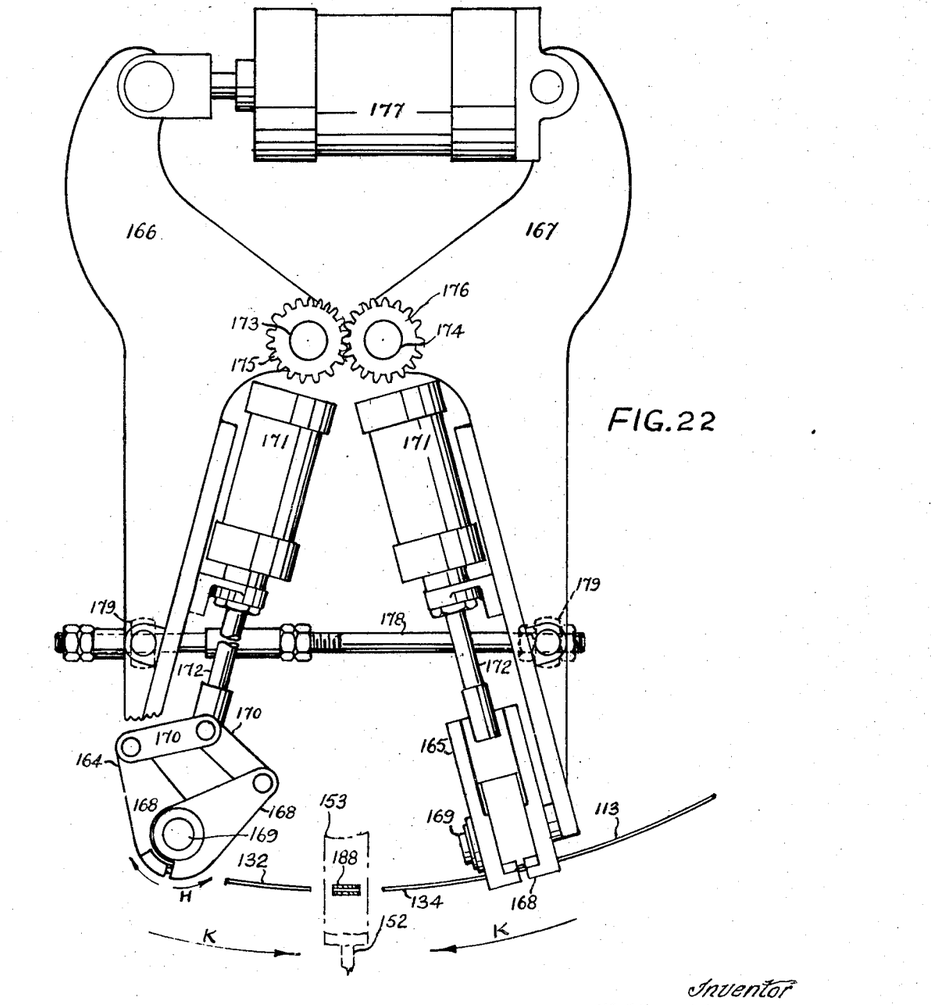
Figure 22 is an end view, on an enlarged scale, of the gripping jaws of Figure 19.

When the two ends 132, 134 of a gapped loop come to rest substantially in the plane of the supporting surface 153 at the commencement of a dwell period of the conveyors, the two ends are gripped by pneumatically operated jaws 164 and 165, shown in detail in Figure 22. The jaws 164 are arranged to grip the end 132 of the loop lying on one side of the surface 153 and the jaws 165 are arranged to grip the end 134 of the loop lying on the other side of the surface 153. The jaws 164 and 165 are identical in construction and they are mounted in the same way on supporting arms 166 and 167, respectively. For the sake of illustrating the construction of these jaws, however, the jaws 164 have been turned through 90° from their actual position in Figure 22.

Each of the jaws 164, 165 comprise a pair of jaw members 168 pivotally mounted intermediate their ends on a pivot 169 secured to the lower end of the arms 166 and 167. At their upper ends the jaw members 168 are pivotally connected to links 170. A pneumatic cylinder 171 mounted on each of the arms 166, 167 has its piston rod 172 pivotally connected to the links 170. By supplying compressed air to one end or the other of the cylinders 171 it will be appreciated that the free ends of the jaw members 168 of each of the jaws 164, 165 can be moved towards or away from each other, as indicated by the arrows H.

Intermediate their ends the arms 166 and 167 are mounted on horizontal pivots 173 and 174, respectively, the axes of these pivots lying parallel to the longitudinal axis of the apparatus. Small toothed pinions 175, 176 mounted on the arms 166 and 167, respectively, are rigidly secured to the arms with their axes coincident with the axes of the pivots 173 and 174, respectively. These two pinions mesh with one another so that rotation of one of the arms 166, 167 about its pivot causes an equal and opposite rotation of the other arm about its pivot. At their upper ends the arms 166 and 167 are connected together by a pneumatic cylinder 177. By supplying compressed air to one end or the other of the cylinder 177 the lower ends of the arms 166 and 167 can be moved towards or away from each other in a substantially vertical plane at right angles to the longitudinal axis of the apparatus. Movement of the lower ends of the arms away from each other is limited by a rod 178 passing through bosses 179 pivotally mounted on the arms 166, 167. The length of the rod 178 is adjustable.

The pivots 173 and 174 are rigidly secured to a frame member 152a (see Figure 19) of the apparatus in such a position that the vertical plane in which the pivoting motion of the arms 166, 167 takes place passes through the ends 132, 134 of a gapped loop 113 brought by the conveyors to the supporting surface 153 as described above.

When a gapped loop 113 arrives at the supporting surface 153 the gripping jaws are in the position shown in Figure 22 and the lower ends of the jaw members 168 are apart. If compressed air is now supplied to the lower ends of the cylinders 171 it will be appreciated that the upper ends of the jaw members 168 of each of the jaws 164 and 165 move towards each other to grip the ends 132, 134 of the gapped loop. Once the ends of the loop have been gripped in this manner the guides 154 are moved from the position 154a to the position shown in full lines in Figure 20 by suppling compressed air to the left hand end of the cylinder 160 (as viewed in Figure 19). This has the effect of releasing the loop gripped by the jaws 164, 165 from the guides 154.

A sleeve holder is slidably mounted on the inclined supporting surface 153. This sleeve holder comprises a block 179 adapted to slide on the supporting surface 153 in guides 180, the block being provided with a semicircular recess 181 at its upper end. The axis of this recess 181 is substantially horizontal and disposed at right angles to the longitudinal axis of the apparatus. At its lower end the block 179 is connected by a link 182 to a crank arm 183 rigidly secured to a toothed quadrant 184. A rack 185 secured to the piston rod 186 of a pneumatic cylinder 187 engages the toothed quadrant 184. By supplying compressed air to one end or the other of the cylinder 187, the block 179 can be made to move in the upward or the downward direction on the supporting surface 153 between the two positions shown, respectively, in full lines and in chain lines in Figure 21. In the lower position of the block 179 a continuous metallic sleeve 188 is fed into the recess 181 with the axis of the sleeve coincident with the axis of the recess. These sleeves, which are used for joining together the ends 132, 134 of the gapped loops 113, are fed to the recess 181 one at a time in any suitable manner. Preferably a gravity feed is employed, the sleeves being led to the recess 181 in the direction of the arrow J by a pipe 189 from a magazine, a "Syntron" bowl feeder or other convenient receptacle (not shown) containing a stock of sleeves. Each time the block 179 moves into its lower position (the chain line position shown in Figure 21) one sleeve 188 is fed into the recess 181. When the block 179, with the sleeve 188 in its recess 181, is moved to its upper position on the supporting surface 153 by the cylinder 187, the sleeve 188 is located in a semicircular recess 190 formed in a further block 191 which is also slidably mounted on the supporting surface 153. The block 191 is urged downwardly on the surface 153 by springs (not shown) arranged between the block 191 and a further block 192 rigidly secured to the surface 153. A stop (not shown) limits the separation of the blocks 191 and 192 to about ¼″. When the block 179 is moved to its upper position it strikes the block 191 and moves the latter upwardly against the action of said springs into contact with the block 192. In this position of the blocks 179 and 191 the sleeve 188 is held by the recesses 181 and 190 with its axis substantially horizontal and in alignment with the loop ends 132, 134 gripped by the jaws 164 and 165 (see Figure 22).

When the block 179 has been moved to its upper position compressed air is supplied to the right hand end of the cylinder 177 (as viewed in Figure 22) so that the loop ends 132, 134 held in the jaws 164, 165 are moved towards each other in the direction of the arrows K and enter opposite ends of the sleeve 188. This movement of the loop ends 132, 134 is arrested by the two ends abutting one another inside the sleeve 188 substantially mid-way between the ends of the latter.

Two punches 193 are slidably mounted in the block 191 with the axes of the punches lying parallel to the supporting surface 153 and at right angles to the axis of the sleeve 188 held in the recesses 181 and 190. The heads of the punches project from the block 191 at the upper end of the latter and the pointed operative ends of the punches enter the recess 190 and rest against the external surface of the sleeve 188, one near to each end of the sleeve. A hammer block 194 is slidably mounted in the block 192 and is connected by a link 195 to the piston rod 196 of a pneumatic cylinder 197. When the ends of the loop have been fed into the sleeve 188 as described above, compressed air is supplied to the upper end of the cylinder 197 so that the hammer block 194 is driven down the supporting surface 153 in the direction of the arrow L against the heads of the punches 193. This causes the pointed lower ends of the punches to nick the sleeve 188 so that the latter is secured temporarily to the two loop ends 132, 134.

After completion of the punching operation compressed air is supplied to the lower ends of the cylinders 171 to release the jaws 164, 165. Compressed air is also supplied to the cylinder 187, to move the block 179 to its lower position where it receives another sleeve 188, and to the cylinder 197 to move the hammer block 194 to its upper position in readiness for the next punching operation. Finally compressed air is supplied to the left hand end of the cylinder 177 (as viewed in Figure 22) to move the lower ends of the arms 166 and 167 away from each other. The sleeved loop is now quite free to be moved away from the supporting surface 153 in the direction of the arrow G by the conveyors 3a, 3b and 4. Before the loop is moved by the conveyors, however, the right hand end of cylinder 160 (as viewed in Figure 19) is supplied with compressed air to move the guides 154 in the direction of the arrow G so that the guides move to the position 154a to locate the ends of the next gapped loop to arrive at the supporting surface 153 in the sleeving position.

The above described mechanism at the sleeving station 7 forms the subject of co-pending application No. 596,001, now Patent No. 2,913,014, of even date.

After leaving the sleeving station 7 the loops are delivered by the conveyors 3a, 3b and 4 to the second transferring mechanism 8 (see Figures 1 and 23-25).

Figures 23, 24, 25:
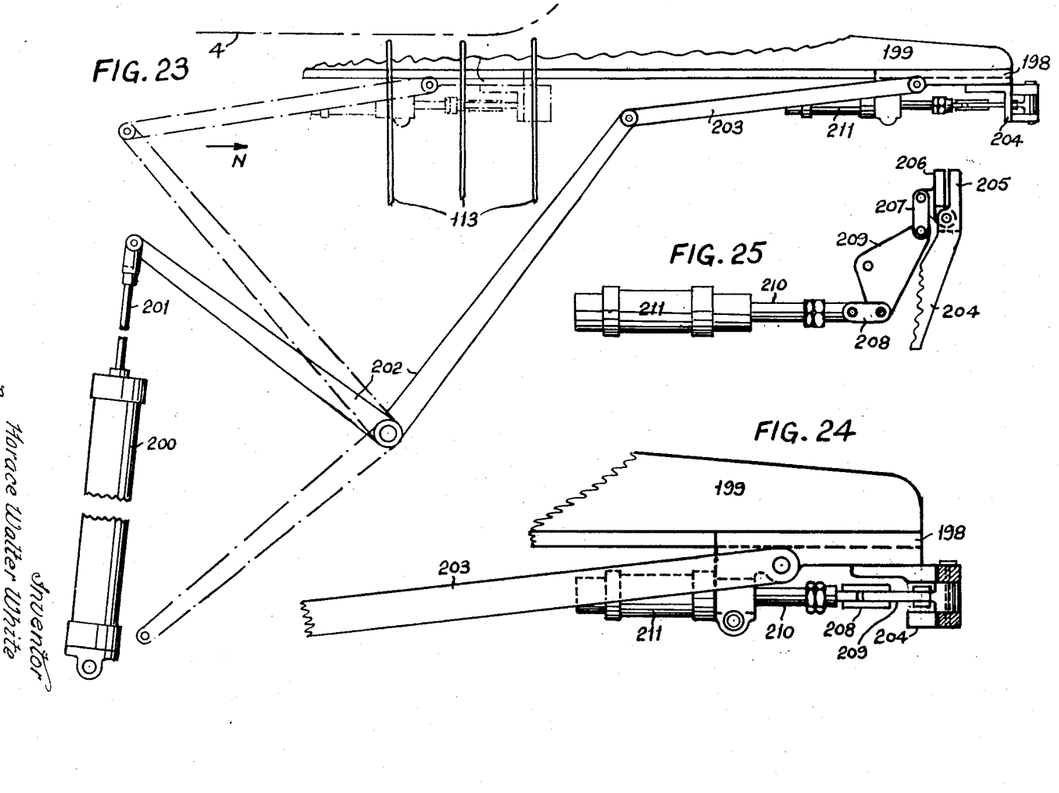
Figure 23 is a side view of a second transferring mechanism of the apparatus.
Figure 24 is a view on an enlarged scale of a part of Figure 23.
Figure 25 is a plan of one of the jaws of the second transferring mechanism.

The transferring mechanism 8 comprises a jaw carrier 198 which is slidably mounted on a horizontal guide 199 lying in a vertical plane passing through the longitudinal axis of the apparatus. The carrier 198 can be moved between the position shown in full lines in Figure 23 and the position 198a shown in chain lines by a pneumatic cylinder 200 having its piston rod 201 connected to the carrier by a bell-crank lever 202 and a link 203. A horizontally disposed cross-member 204 secured to the carrier 198 is provided with a pair of jaws 205, 206 at each of its ends. Figure 25 is a plan of one end of the cross member 204, the two ends of the latter being identical. The jaws 205 are secured rigidly to the cross-member 204 while the jaws 206 are pivotally mounted thereon. Each of the jaws 206 is connected by links 207, 208 and a bell-crank lever 209 to the piston rod 210 of a pneumatic cylinder 211, the two cylinders 211 being mounted on the carrier 198.

In order to receive a loop from the conveyors of the apparatus the jaws 206 are first opened by suppling compressed air to the left hand end of each of the cylinders 211. This has the effect of moving each jaw 206 into a position substantially at right angles to its associated jaw 205. The carrier is then moved from the full line position shown in Figure 23 to the chain line position 198a by supplying compressed air to the upper end of the cylinder 200. In this position of the carrier the two jaws 206 are brought up to the leading loop of the loops 113 being carried in the direction of the arrow N by the chain conveyors. In Figure 23 the path of the links of the lower flight of the upper conveyor 4 is shown by a chain line. Compressed air is then supplied to the right hand end of each of the cylinders 211 to return the jaws 206 to the position shown in Figure 25 so that the leading loop is gripped between the two pairs of jaws 205, 206 on each side of and equidistant from a vertical plane passing through the centre line of the apparatus. Compressed air is then supplied to the lower end of the cylinder 200 to return the carrier to the position shown in full lines in Figure 23. In this position of the carrier 198 the loop carried thereby is vertically above the swaging machine 9. A vertical movable arm (not shown in the drawings) carrying a pair of jaws then moves down to grip the loop at its highest point and, when the loop has been gripped in this manner, compressed air is supplied to the left hand end of each cylinder 211 to open the jaws 205, 206. Said vertically movable arm then moves the loop down to the swaging machine 9. When it has entered the swaging machine the loop is flattened somewhat so that its assumes a slightly oval shape with its minor axis vertical. This flattening of the loop causes the loop to leave the jaws 205, 206 so that the carrier 198 can be returned to the position 198a in readiness to receive the next loop from the conveyors. The swaging machine 9 employed is identical with that illustrated in Figures 3 to 6 of U.S. appln. Serial No. 234,922 and it is driven by an electric motor through a pneumatically operated clutch. When the transferring mechanism 8 has delivered a loop into the swaging machine, the loop is gripped by the clamping means 93 shown in Figures 3 and 4 of U.S. Serial No. 234,922.

When the loop has been clamped within the swaging machine the clutch of the swaging machine is engaged automatically and the sleeve on the loop is traversed through the swaging machine as described in specification No. 684,430. At the end of the swaging operation the clutch is disengaged and the housing members 45, 46 (Figures 3 to 6 of U.S. Serial No. 234,922) are opened.

The formation of the sleeved loop is now completed and the swaged loops may be removed from the swaging machine by hand. In Figure 1, however, the third transferring mechanism 10 is arranged to lift the swaged loops out of the swaging machine 9 and to deliver them to a conveyor 212. To this end a vertically movable rod 213 actuated by a pneumatic cylinder (not shown) and carrying a pair of jaws at its lower end is slidably mounted above the swaging machine on a frame member 214 of the apparatus. When a loop has been released by the swaging machine 9 the rod 213 descends and grips the swaged loop. The rod then rises and delivers the loop to a pair of jaws 215 mounted on the end of a swingable arm 216. When the jaws 215 have received the loop the latter is released by the jaws on the rod 213 and the arm 216 is swung down in an anticlockwise direction about its pivot 217 to deliver the loop on to the conveyor 212.

This conveyor, which is driven intermittently by suitable pneumatic means, delivers the swaged loops one at a time on to an expandable mandrel 218 at the proof-loading and size checking station 11. From the mandrel 218 the loops are transferred one at a time on to a tiltable platform 219. The latter is capable of adopting one of two positions in dependence on the measurements made at the proof-loading and size checking station 11. If a loop is unsatisfactory as regards either proof-loading or size the platform 219 is tilted in such a direction that the faulty loop is discharged into a reject receptacle. If, on the other hand, the loop is satisfactory it is directed by the platform into a different receptacle.

In the above-described apparatus the movements of the mechanisms at the various processing stations and at the loop former 1 are synchronised with the movements of the conveyors in such a way that the various operations of loop forming, thread rolling, sleeving, swaging and proof-loading and the various transferring movements take place on different loops contemporaneously in one dwell period of the conveyors. The conveyors, on the other hand, can only move when the above-mentioned operations and transferring movements have been completed.

The invention is not, of course, limited to the particular machine described above. Thus, although it is preferred to roll a thread at the ends of the gapped loops it is possible to deform or cut the ends of the loop in some other way. For example, the ends of the loop may be pressed to form grooves or indentations therein. Again, although it is preferred to swage the sleeve on to the ends of the loop it is possible to close the sleeve in a press or by other mechanical working processes.

I claim:

1. In a machine for automatically forming closed wire loops from linear wire stock, the combination comprising, a rotatable loop former including a drum receptive of the wire stock, gripper means for engaging and releasing the free end of the wire stock tangentially of the drum, means for periodically operating said loop former to partially rotate said drum between stop limits to produce a single open-ended loop of wire thereabout, means severing such loop from the stock, means releasing said gripper means, means for holding said severed loop on said drum, means for stripping such open-ended loop from said drum including additional holding means, deforming means for deforming opposed end portions of said loop, means for positioning a substantially cylindrical sleeve member between said end portions, means for inserting said end portions into opposite ends of said sleeve member and abuttingly engaging the same therewithin, means for swaging said sleeve onto said deformed end portions to rigidly lock the same together and close the loop means for transferring loops from said additional holding means to said deforming, positioning, inserting and swaging means, and means for driving and synchronizing the activities of said several means in accordance to a preselected and integrated cycle of operation to accomplish the automatic production of closed loops.

2. The combination as set forth in claim 1 in which said deforming means comprises a pair of thread formers each engaging an end portion of said wire loop to form threads thereon.

3. The combination as set forth in claim 1 in which both said holding means and additional holding means employ magnetic force to hold the loop.

References Cited in the file of this patent

UNITED STATES PATENTS

| | | |
|---|---|---|
| 379,876 | Nutt | Mar. 20, 1888 |
| 705,130 | Perry | July 22, 1902 |
| 746,442 | Bates | Dec. 8, 1903 |
| 1,850,126 | Bruckner | Mar. 22, 1932 |
| 2,066,483 | Pearson | Jan. 5, 1937 |
| 2,213,224 | Littlehale | Sept. 3, 1940 |
| 2,280,351 | Penfold | Apr. 21, 1942 |
| 2,340,448 | Andren | Feb. 1, 1944 |
| 2,708,228 | Crabbe | May 10, 1955 |